(12) United States Patent
Leng

(10) Patent No.: US 12,448,994 B2
(45) Date of Patent: Oct. 21, 2025

(54) ASSEMBLY STRUCTURE FOR BED COLUMN AND LATERAL BED ROD

(71) Applicant: Luhao Leng, Xiamen (CN)

(72) Inventor: Luhao Leng, Xiamen (CN)

( * ) Notice: Subject to any disclaimer, the term of this patent is extended or adjusted under 35 U.S.C. 154(b) by 405 days.

(21) Appl. No.: 17/967,190

(22) Filed: Oct. 17, 2022

(65) Prior Publication Data

US 2023/0375025 A1 Nov. 23, 2023

(30) Foreign Application Priority Data

May 19, 2022 (CN) .......................... 202221205018.1

(51) Int. Cl.
*F16B 12/54* (2006.01)
*A47C 19/00* (2006.01)

(52) U.S. Cl.
CPC ............ *F16B 12/54* (2013.01); *A47C 19/005* (2013.01)

(58) Field of Classification Search
CPC .......... F16B 12/52; F16B 12/54; F16B 12/56; A47C 19/00; A47C 19/005; A47C 19/02; A47C 19/021; A47C 19/024; A47C 19/025; A47C 19/028; A47C 19/04; A47C 19/045
See application file for complete search history.

(56) References Cited

U.S. PATENT DOCUMENTS

| | | | | |
|---|---|---|---|---|
| 1,694,885 A * | 12/1928 | Matheson | ............... | F16B 12/56 16/374 |
| 3,226,736 A * | 1/1966 | Krieger | ................ | A47C 19/005 5/296 |
| 3,590,753 A * | 7/1971 | Blink | ...................... | F16B 12/52 248/188 |
| 3,748,668 A * | 7/1973 | Rudin | ..................... | F16B 12/54 5/296 |
| 3,754,728 A * | 8/1973 | Bowman | ................. | F16B 12/52 248/188 |
| 5,165,638 A * | 11/1992 | Fallon | ..................... | F16B 12/52 248/188.7 |
| 2002/0136591 A1* | 9/2002 | Callahan | ................ | A47B 13/04 403/188 |
| 2005/0278849 A1* | 12/2005 | Polevoy | ............... | A47C 19/024 5/310 |
| 2017/0188716 A1* | 7/2017 | Leng | .................... | A47C 19/202 |
| 2019/0142175 A1* | 5/2019 | Cantrell | ................... | F16B 12/36 5/9.1 |
| 2019/0343291 A1* | 11/2019 | Avegno | ................ | A47C 1/0342 |
| 2022/0061540 A1* | 3/2022 | Ermalovich | ......... | A47C 19/005 |

* cited by examiner

*Primary Examiner* — George Sun
(74) *Attorney, Agent, or Firm* — Cooper Legal Group, LLC

(57) ABSTRACT

An assembly structure for a bed column and a lateral bed rod is provided. The bed column is arranged vertically and comprises an upper column and a lower column. The lower column comprises a joint section. The upper column is sleeved on the joint section and is stopped at a positioning step formed at a bottom end of the joint section. The lateral bed rod is horizontally, laterally arranged. The lateral bed rod is connected with a locking piece adjacent to a side of the positioning step and abutting the upper column and the lower column. A first portion of the locking piece is locked with an upper bolt enabling the locking piece, the upper column, and the joint section to be locked together. A second portion of the locking piece is locked with a lower bolt enabling the locking piece and the lower column to be locked together.

10 Claims, 4 Drawing Sheets

ASSEMBLY STRUCTURE FOR BED COLUMN AND LATERAL BED ROD

RELATED APPLICATIONS

This application claims priority to Chinese patent application number 202221205018.1, filed on May 19, 2022. Chinese patent application number 202221205018.1 is incorporated herein by reference.

FIELD OF THE DISCLOSURE

The present disclosure relates to an assembly structure for a bed column and a lateral bed rod, and in particular to an assembly structure for a bed column and a lateral bed rod of an iron frame bed.

BACKGROUND OF THE DISCLOSURE

For the connection between a column and a lateral rod of an iron frame bed, the traditional connection method is to use a hook. The hook is disposed at an end of the lateral rod, and a hanging ring is disposed on a side of the column for receiving the hook to achieve hanging connection. However, this connection is very loose, and the lateral rod easily shakes. The reason why the traditional connection method does not use welding is because an assembly process of the iron frame bed is done by consumers at home. The consumers do not have welding tools, and even if they do, they may not be able to operate them properly, and it is not safe. Therefore, it is not possible for consumers to assemble the iron frame bed by welding.

More recently, the improved connection method disposes a connecting sleeve at the end of the lateral rod and forms a position-limiting step on the column. The connecting sleeve is sleeved onto the column from top to bottom, and finally a height position of the connecting sleeve is determined by the position-limiting step. Since the connecting sleeve needs to be sleeved on the column from an upper end of the column and a length of the column is large, the assembly operation is inconvenient. In addition, when the column is a multi-section structure for being connected together by inserting sections of the multi-section structure one-by-one, although the connecting sleeve can be sleeved onto a lower part of the column before the column is assembled, the structure of the column is not firm because the connecting sleeve does not sleeve a position at which the column is assembled. Even if the connecting sleeve can sleeve the position where the column is assembled, the connection among an upper part of the column, the lower part of the column, and the connecting sleeve is not tight enough, and the column easily shakes.

BRIEF SUMMARY OF THE DISCLOSURE

The present disclosure provides an assembly structure for a bed column and a lateral bed rod, which is easy to assemble and is firm. A technical solution of the present disclosure is as follows.

An assembly structure for a bed column and a lateral bed rod is provided. The bed column is arranged vertically and comprises an upper column and a lower column that are configured to be inserted together in an up-and-down direction. An upper end of the lower column comprises a joint section formed by reducing a diameter of the upper end of the lower column. A positioning step is formed at a bottom end of the joint section. The upper column is sleeved on the joint section from top to bottom and is stopped at the positioning step. The lateral bed rod is horizontally, laterally arranged. An end surface of the lateral bed rod is connected with a locking piece, and the locking piece is adjacent to a side of the positioning step and abuts an outer side of the upper column and an outer side of the lower column. A first portion of the locking piece that extends upward beyond an upper surface of the lateral bed rod is locked with an upper bolt, and the upper bolt enables the locking piece, the upper column, and the joint section to be locked together. A second portion of the locking piece that extends downward beyond a lower surface of the lateral bed rod is locked with a lower bolt, and the lower bolt enables the locking piece and the lower column to be locked together.

Since the end of the lateral bed rod is connected with the locking piece and the length of the locking piece is long enough, an upper side and a lower side of the locking piece are beyond the upper surface and the lower surface of the lateral bed rod enough to enable the bolt connection, and the locking piece can be attached to the outer side of the upper column and the outer side of the lower column, so that the upper bolt and the lower bolt can firmly lock the three parts of the upper column, the lower column, and the lateral bed rod together to form a firm T-shaped structure, which does not shake and the number of bolts is few. When the upper column and the lower column are connected together, the locking piece of the lateral bed rod can be locked on the bed column, and it is very convenient for consumers to assemble.

In preferred embodiment, the upper column is locked with a reinforcing bolt, the reinforcing bolt enables the upper column and the joint section to be locked together, and the reinforcing bolt is located above the upper bolt.

In preferred embodiment, the reinforcing bolt, the upper bolt, and the lower bolt are arranged in a straight line.

In preferred embodiment, the lower column is disposed with pull rivets respectively corresponding to the upper bolt and the lower bolt.

In preferred embodiment, the lower column is disposed with a pull rivet corresponding to the reinforcing bolt.

In preferred embodiment, the locking piece is arc-shaped to correspond to a shape of the outer side of the upper column and a shape of the outer side of the lower column. The locking piece is arc-shaped, which fits with an outer surface of the column, which can further prevent loosening.

In preferred embodiment, a left side and a right side of the locking piece respectively comprises a folded edge folded toward the lateral bed rod. In this way, not only is the strength of the locking piece better, but also the connection and installation operation of the locking piece and the lateral bed rod is facilitated.

In preferred embodiment, the locking piece is welded with the lateral bed rod.

In preferred embodiment, the upper surface of the lateral bed rod is flush with the positioning step.

In preferred embodiment, the lower column is fixedly connected to a longitudinal bed rod. The longitudinal bed rod is directly and fixedly connected with the lower column, which can reduce the assembly step of the longitudinal bed rod, save the assembly workload, and make the assembly process more convenient.

DETAILED DESCRIPTION OF THE EMBODIMENTS

The present disclosure will be further described below in combination with the accompanying drawings and embodiments.

Figure 1:
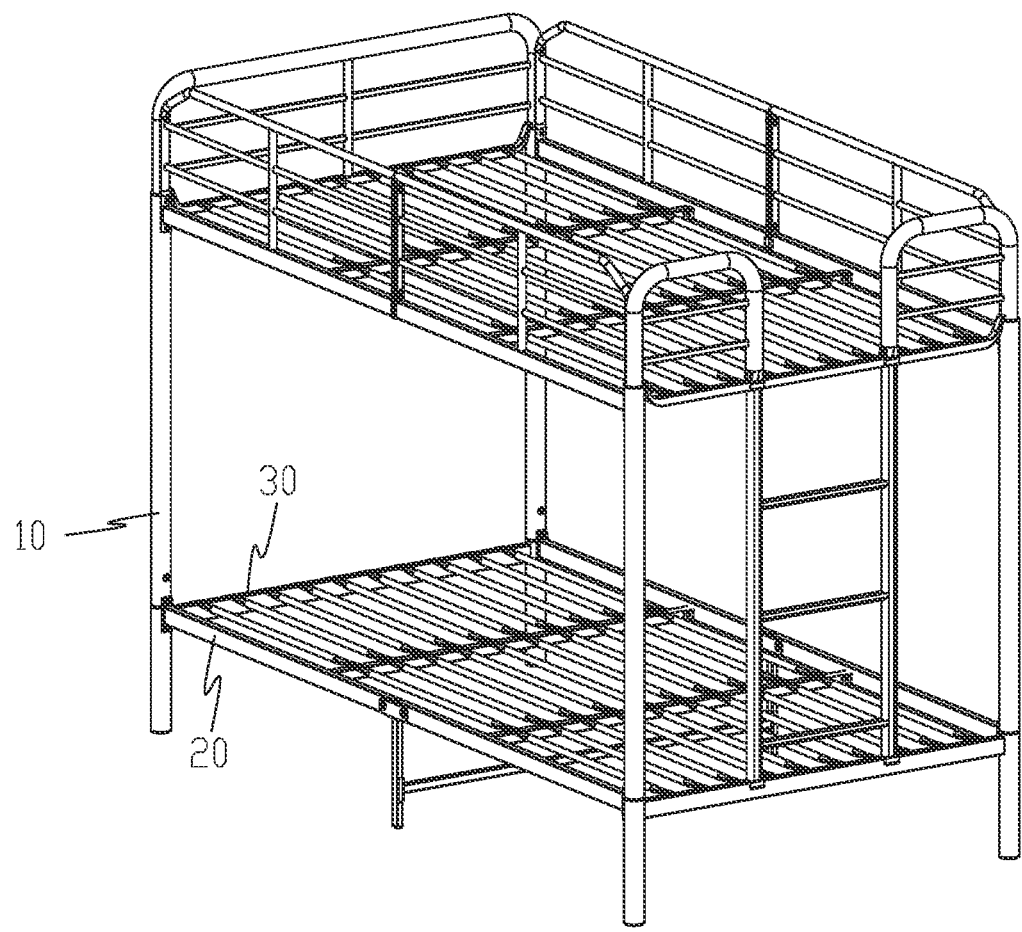
FIG. 1 illustrates a perspective view of a double-layer iron frame bed.

Referring to FIG. 1, a double-layer iron frame bed is provided and comprises two bunks disposed along a height direction of the double-layer iron frame. All sides of the two bunks are supported by four bed columns 10. A lower bunk of the two bunks comprises two lateral bed rods symmetrically disposed on a front side and a rear side of the lower bunk and two longitudinal bed rods 30 symmetrically disposed on a left side and a right side of the lower bunk. The specific connection structure between the four bed columns 10 and the two lateral bed rods 20 will be described in detail with reference to FIGS. 2 to 4.

Figure 2:
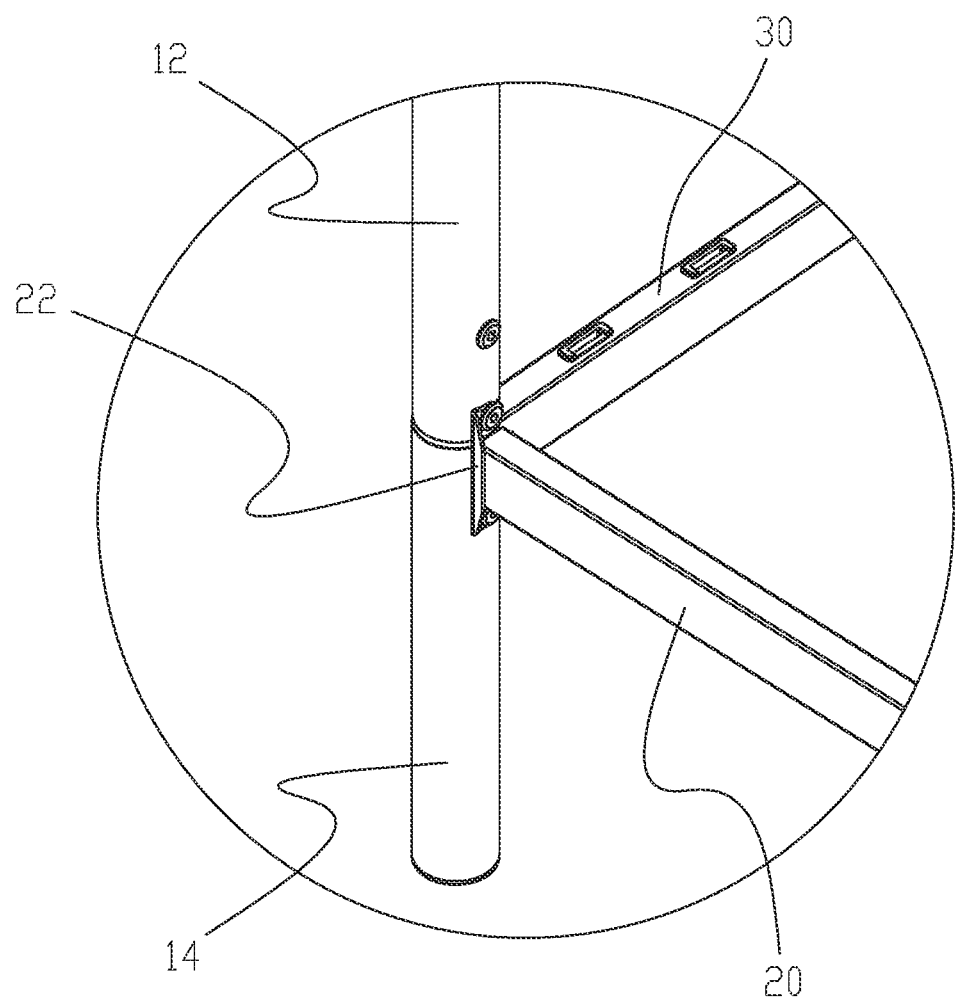
FIG. 2 illustrates an enlarged perspective view of a bed column, a lateral bed rod, and a longitudinal bed rod as illustrated in FIG. 1 being connected together.
Figure 3:
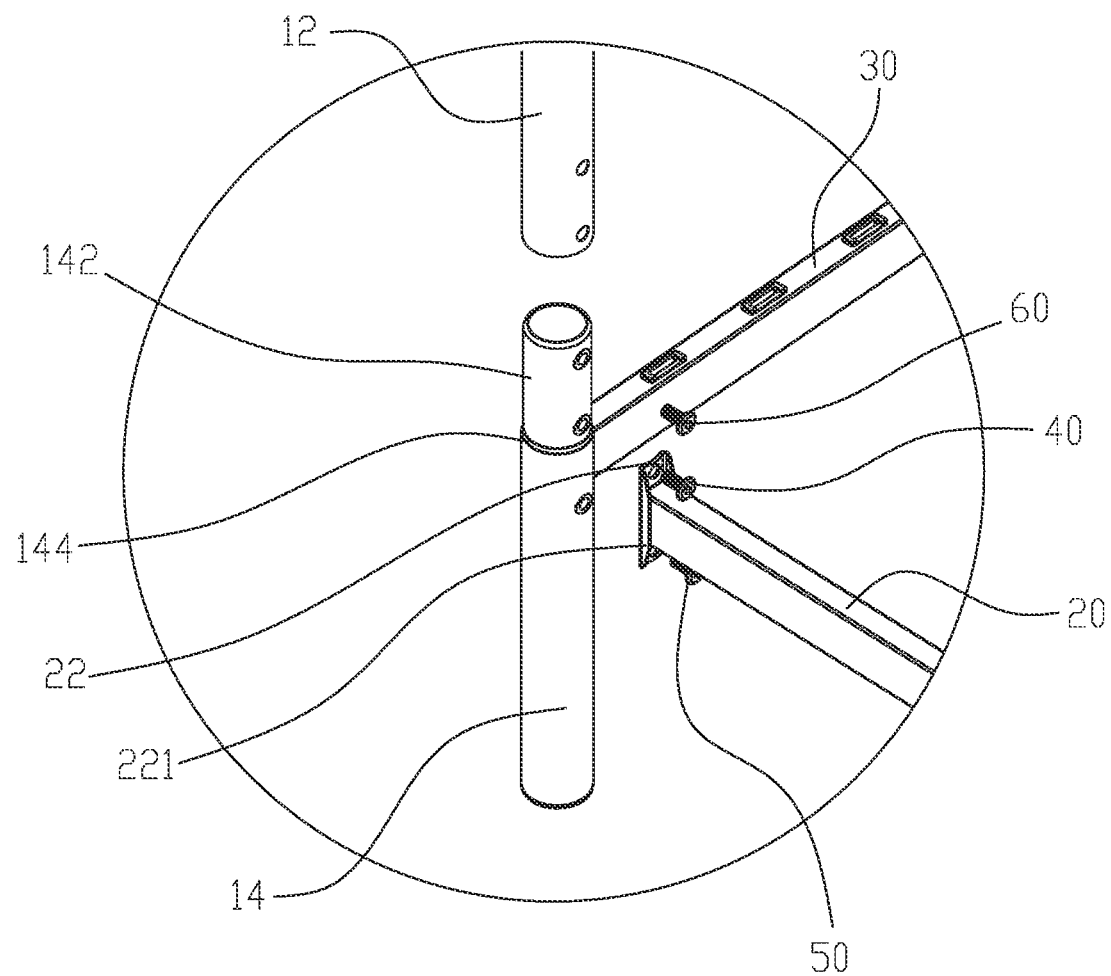
FIG. 3 illustrates an enlarged view of an exploded view of the bed column, the lateral bed rod, and the longitudinal bed rod illustrated in FIG. 1.
Figure 4:
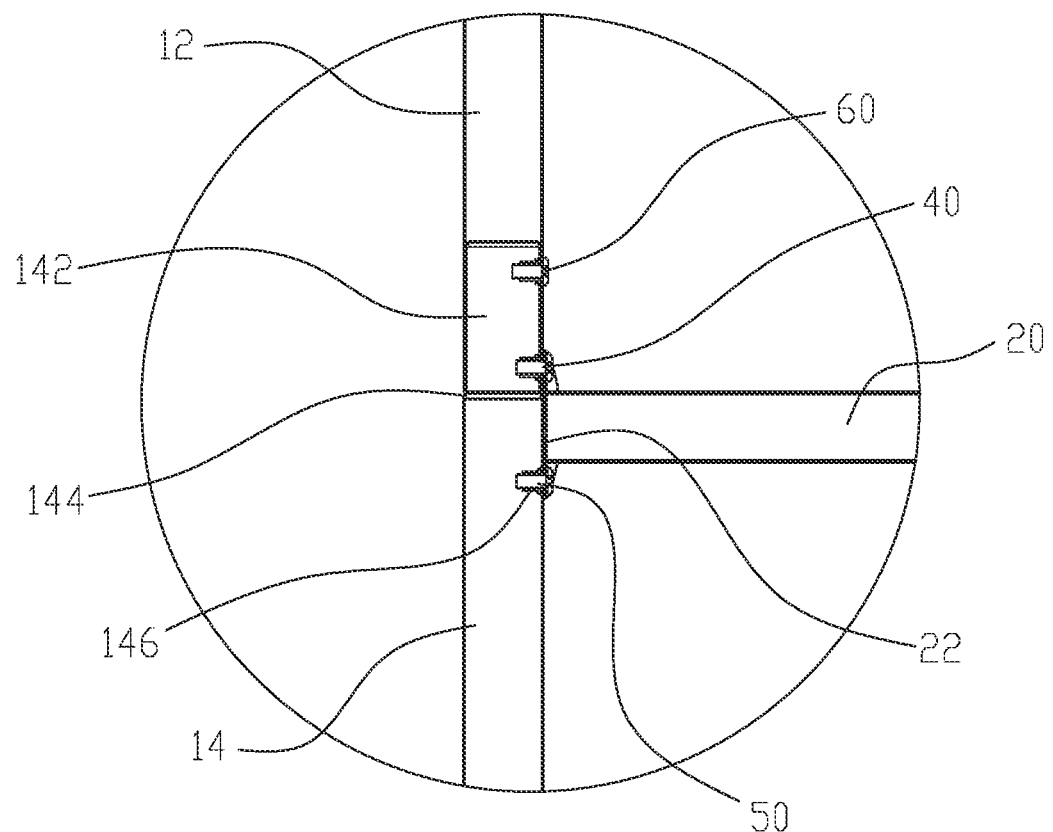
FIG. 4 illustrates an enlarged view of a cross-sectional view of the bed column, the lateral bed rod, and the longitudinal bed rod illustrated in FIG. 1.

Referring to FIGS. 2 to 4, the four bed columns 10 are vertically arranged, and each of the four bed columns 10 comprises an upper column 12 and a lower column 14 that can be inserted together in an up-and-down direction. The lower column 14 can be supported on the ground. An upper end of the lower column 14 comprises a joint section 142 formed by reducing a diameter of the upper end of the lower column 14, and a positioning step 144 is formed at a bottom end of the joint section 142. The upper column 12 is sleeved on the joint section 142 from top to bottom and is stopped at the positioning step 144. The two lateral bed rods 20 are horizontally, laterally arranged, and an end surface of each of the two lateral bed rods 20 is connected with a locking piece 22. The locking piece 22 is adjacent to a side of the positioning step 144 and abuts an outer side of the upper column 12 and an outer side of the lower column 14. A first portion of the locking piece 22 that extends upward beyond an upper surface of each of the two lateral bed rods 20 is locked with an upper bolt 40, and the upper bolt 40 enables the locking piece 22, the upper column 12, and the joint section 142 to be locked together. A second portion of the locking piece 22 that extends downward beyond a lower surface of each of the two lateral bed rods 20 is locked with a lower bolt 50, and the lower bolt 50 enables the locking piece 22 and the lower column 14 to be locked together.

Preferably, the upper column 12 is also locked with a reinforcing bolt 60. The reinforcing bolt 60 enables the upper column 12 and the joint section 142 to be locked together, and the reinforcing bolt 60 is located above the upper bolt 40. It can be seen from the figures that a distance between the reinforcing bolt 60 and the upper bolt 40 is substantially the same as a distance between the upper bolt 40 and the lower bolt 50.

Preferably, the reinforcing bolt 60, the upper bolt 40, and the lower bolt 50 are arranged in a straight line.

Preferably, the lower column 14 is disposed with pull rivets 146 respectively corresponding to the upper bolt 40 and the lower bolt 50. Similarly, the lower column 14 is also disposed with one of the pull rivets 146 corresponding to the reinforcing bolt 60.

Preferably, the locking piece 22 is arc-shaped to correspond to a shape of the outer side of the upper column 12 and a shape of the outer side of the lower column 14.

Preferably, a left side and a right side of the locking piece 22 respectively comprises a folded edge 221 folded toward a corresponding one of the two lateral bed rods 20.

Preferably, the locking piece 22 is welded with the corresponding one of the two lateral bed rods 20.

Preferably, the upper surface of each of the two lateral bed rods 20 is flush with the positioning step 144.

Preferably, the lower column 14 is fixedly connected to a corresponding one of the two longitudinal bed rods 30, and the lower column 14 and the corresponding one of the two longitudinal bed rods 30 can be fixedly connected together by welding. Therefore, when the lower bunk is assembled, it is only necessary to lock the two lateral bed rods 20 and the four bed columns 10 together, and the installation process is simple and quick.

The aforementioned embodiments are merely some embodiments of the present disclosure, and the scope of the disclosure is not limited thereto. Thus, it is intended that the present disclosure cover any modifications and variations of the presently presented embodiments provided they are made without departing from the appended claims and the specification of the present disclosure.

What is claimed is:

1. An assembly structure for a bed column and a lateral bed rod, wherein:
   the bed column is arranged vertically and comprises an upper column and a lower column that are configured to be inserted together in an up-and-down direction,
   an upper end of the lower column comprises a joint section formed by reducing a diameter of the upper end of the lower column,
   a positioning step is formed at a bottom end of the joint section,
   the positioning step is disposed no lower than an upper surface of the lateral bed rod,
   the upper column is sleeved on the joint section from top to bottom and is stopped at the positioning step,
   the lateral bed rod is horizontally, laterally arranged,
   an end surface of the lateral bed rod is connected with a locking piece,
   the locking piece is adjacent to a side of the positioning step and abuts an outer side of the upper column and an outer side of the lower column,
   a first portion of the locking piece that extends upward beyond the upper surface of the lateral bed rod is locked with an upper bolt,
   the upper bolt enables the locking piece, the upper column, and the joint section to be locked together,
   a second portion of the locking piece that extends downward beyond a lower surface of the lateral bed rod is locked with a lower bolt,
   the lower bolt enables the locking piece and the lower column to be locked together,
   the upper column is locked with a reinforcing bolt,
   the reinforcing bolt enables the upper column and the joint section to be locked together in absence of the lower column, and
   the reinforcing bolt is located above the upper bolt.

2. The assembly structure for the bed column and the lateral bed rod according to claim 1, wherein:
   the reinforcing bolt, the upper bolt, and the lower bolt are arranged in a straight line.

3. The assembly structure for the bed column and the lateral bed rod according to claim 1, wherein:

the lower column is disposed with pull rivets respectively corresponding to the upper bolt and the lower bolt.

4. The assembly structure for the bed column and the lateral bed rod according to claim 1, wherein:
the lower column is disposed with a pull rivet corresponding to the reinforcing bolt.

5. The assembly structure for the bed column and the lateral bed rod according to claim 1, wherein:
the locking piece is arc-shaped to correspond to a shape of the outer side of the upper column and a shape of the outer side of the lower column.

6. The assembly structure for the bed column and the lateral bed rod according to claim 1, wherein:
a left side and a right side of the locking piece respectively comprises a folded edge folded toward the lateral bed rod.

7. The assembly structure for the bed column and the lateral bed rod according to claim 1, wherein:
the locking piece is welded with the lateral bed rod.

8. The assembly structure for the bed column and the lateral bed rod according to claim 1, wherein:
the upper surface of the lateral bed rod is flush with the positioning step.

9. The assembly structure for the bed column and the lateral bed rod according to claim 1, wherein:
the lower column is fixedly connected to a longitudinal bed rod.

10. The assembly structure for the bed column and the lateral bed rod according to claim 5, wherein:
a left side and a right side of the locking piece respectively comprises a folded edge folded toward the lateral bed rod.

\* \* \* \* \*